United States Patent
Aoki et al.

Patent Number: 5,610,766
Date of Patent: Mar. 11, 1997

[54] ZOOMING LENS SYSTEM

[75] Inventors: Norihiko Aoki, Hachioji; Takanori Yamanashi, Kokubunji, both of Japan

[73] Assignee: Olympus Optical Co., Ltd., Tokyo, Japan

[21] Appl. No.: 442,339

[22] Filed: May 16, 1995

[30] Foreign Application Priority Data

May 17, 1994 [JP] Japan .................................. 6-102774

[51] Int. Cl.⁶ .................................................. G02B 15/14
[52] U.S. Cl. ............................................ 359/683; 359/684
[58] Field of Search .................................. 359/683, 684, 359/763

[56] References Cited

U.S. PATENT DOCUMENTS

| | | | |
|---|---|---|---|
| 4,189,213 | 2/1980 | Iizuka | 359/683 |
| 4,501,475 | 5/1982 | Fujita et al. | 359/683 |
| 4,696,553 | 9/1987 | Tsuji et al. | 359/683 |
| 4,830,477 | 5/1989 | Takahashi et al. | 359/683 |
| 5,056,900 | 10/1991 | Mukaiya et al. | 359/676 |

FOREIGN PATENT DOCUMENTS

| | | |
|---|---|---|
| 60-170817 | 9/1985 | Japan . |
| 61-51297 | 11/1986 | Japan . |
| 61-258220 | 11/1986 | Japan . |
| 62-186216 | 8/1987 | Japan . |

Primary Examiner—Scott J. Sugarman
Attorney, Agent, or Firm—Cushman, Darby & Cushman IP Group of Pillsbury Madison & Sutro LLP

[57] ABSTRACT

The invention provides a zooming lens system which covers a wide-angle zone, has a zooming ratio of approximately 3 or higher, and is well corrected for various aberrations. This system comprises, in order from the object side, a first lens unit I having positive refracting power, a second lens unit II having negative refracting power, a third lens unit III having positive refracting power, a fourth lens unit IV having positive refracting power and a fifth lens unit V having positive refracting power, with at least said first, third, fourth and fifth lens units being moved toward the object side for zooming from the wide-angle end to the telephoto end, and conforms to the following conditions:

$$-0.8 < f_2/f_W < -0.5 \quad (1)$$

$$-0.7 < f_{T12}/f_T < -0.3 \quad (2)$$

Here $f_2$ is the focal length of the second lens unit, $f_W$ is the focal length of the entire system at the wide-angle end, $f_{T12}$ is the composite focal length of the first and second lens units at the telephoto end, and $f_T$ is the focal length of the entire system at the telephoto end.

9 Claims, 4 Drawing Sheets

(Wide-angle end)

(Intermediate)

(Telephoto end)

(Wide-angle end)

(Intermediate)

(Telephoto end)

FIG. 3

(Wide-angle end)

(Intermediate)

(Telephoto end)

FIG. 4

(Wide-angle end)

(Intermediate)

(Telephoto end)

ZOOMING LENS SYSTEM

BACKGROUND OF THE INVENTION

The present invention relates generally to a zooming lens system, and more particularly to a zooming lens system designed to cover a wide-angle zone and have a zooming ratio of approximately 3 or higher.

Recently available cameras have more sophisticated functions and, with this, a zooming lens system such as one used for a still camera is desired to be large in terms of zooming ratio and compact, so that the range from the wide-angle end of a larger field angle to the telephoto end having a long focal length can be covered by use of a single lens system.

Among wide-angle zooming lens systems so far proposed in the art, there is a two-unit type of zooming lens system comprising a negative lens unit and a positive lens unit, as viewed in order from the object side, with the separation between both the units being varied for zooming. Although this type of zooming lens system is beneficial for increasing the field angle at the wide-angle end, however, much difficulty is involved in making satisfactory correction of aberrations, because the pencil of rays is diverged by the negative lens unit on the object side and so the heights of the rays incident on the positive lens unit are increased. Generally, the zooming ratio achieved is at most approximately 2.

Among recently developed wide-angle zooming lens systems having a zooming ratio of approximately 3 or higher, on the other hand, there are four- or five-unit systems with the foremost lens unit being of the positive type. For instance, a lens system which comprises, in order from the object side, a first positive lens unit, a second negative lens unit, a third positive lens unit, a fourth positive lens unit and a fifth positive lens unit is proposed, as typically disclosed in JP-A 57(1982)-195213, JP-A 60(1985)-170817, JP-A 61(1986)-258220, and JP-A 62(1987)-186216. However, this and other known zooming lens systems have a particularly long full length at the wide-angle end and less than satisfactory in terms of compactness as well.

SUMMARY OF THE INVENTION

In view of such problems as described in relation to the prior art, it is an object of the present invention to provide a compact zooming lens system which covers a wide-angle zone, has a zooming ratio of approximately 3 or higher, and is well corrected for various aberrations.

According to the present invention, the object mentioned above is achieved by the provision of a zooming lens system which comprises, in order from the object side, a first lens unit having positive refracting power, a second lens unit having negative refracting power, a third lens unit having positive refracting power, a fourth lens unit having positive refracting power and a fifth lens unit having positive refracting power, with at least said first, third, fourth and fifth lens units being moved toward the object side for zooming from the wide-angle end to the telephoto end, and which conforms to the following conditions:

$$-0.8 < f_2/f_W < -0.5 \quad (1)$$

$$-0.7 < f_{T12}/f_T < -0.3 \quad (2)$$

Here $f_2$ is the focal length of the second lens unit, $f_W$ is the focal length of the entire system at the wide-angle end, $f_{T12}$ is the composite focal length of the first and second lens units at the telephoto end, and $f_T$ is the focal length of the entire system at the telephoto end.

Preferably, focusing is done by the concurrent movement of the first and second lens units.

Preferably, at least one of the following conditions is satisfied:

$$-0.2 < f_2/f_T < -0.1 \quad (3)$$

$$0.25 < f_{W345}/f_T < 0.35 \quad (4)$$

$$-1.2 < f_{W12}/f_W < -0.8 \quad (5)$$

Here $f_{W345}$ is the composite focal length of the third, fourth and fifth lens units at the wide-angle end, and $f_{W12}$ is the composite focal length of the first and second lens units at the wide-angle end.

Preferably, on the image side of the third lens unit there is located an axially movable flare stop.

Preferably, the following conditions are satisfied:

$$-0.6 < f_{T12}/f_T < -0.4 \quad (2')$$

$$-1.05 < f_{W12}/f_W < -0.85 \quad (5')$$

Preferably, the following conditions are satisfied:

$$-0.75 < f_2/f_W < -0.55 \quad (1')$$

$$-0.2 < f_2/f_T < -0.15 \quad (3')$$

Preferably, while the second lens unit remains fixed during zooming, the fourth lens unit is moved toward the object side at a faster speed than the third and fifth lens units.

It is here preferable that the flare stop mentioned above has a variable aperture, the size of which becomes maximum at the wide-angle end.

In the following description, reference is made to why the above-mentioned lens arrangement is used and how it works.

In the case of a zooming lens system with the foremost lens unit being of the positive type such as one contemplated in the present invention, the second unit lens having negative refracting power makes a chief contribution to zooming. In this type of zooming lens system which has a zooming ratio of approximately 3 or higher and is designed to cover a zooming space from a wide-angle zone having a larger field angle to a telephoto zone having a longer focal length, e.g., a wide-angle zone with the focal length at the wide-angle end being shorter than the diagonal length of the image surface, the second lens unit becomes proximate to the first lens unit at the wide-angle end to allow the overall lens system to be of the retrofocus type while the second lens unit is farthest off the first lens unit at the telephoto end to allow the entire lens system to be of the telephoto type.

To make the field angle at the wide-angle end wider and the zooming ratio higher as well as to make the overall length of the lens system from the wide-angle end to the telephoto end shorter, how the negative refracting power of the second lens unit is efficiently increased is of great importance. However, when the field angle at the wide-angle end of the lens system is made wide by increasing the negative refracting power of the second lens unit while the lens system is made to have a high zoom ratio and kept compact, various aberrations introduced by the second lens unit become too pronounced. Besides, the overall negative Petzval sum of the lens system becomes too large, ending up with a serious problem that the image surface tilts in the direction opposite to the object side.

To provide a solution to these problems at once while various aberrations remain well corrected, the zooming lens system of the present invention is characterized by using the lens unit arrangement mentioned above and conforming to conditions (1) and (2).

Condition (1) is provided to achieve a high zooming ratio while the overall length of the lens system is made short at the wide-angle end in particular. When the lower limit of −0.8 in condition (1) is not reached, the refracting power of the second lens unit having negative lens unit becomes too small; that is, the amount of movement of the second lens unit must be increased to make the zooming ratio high, so rendering it impossible to make the lens system compact. When the upper limit of −0.5 is exceeded, on the contrary, the refracting power of the second lens unit becomes too large, and so various aberrations, especially the negative distortion at the wide-angle end become too pronounced for correction. At the same time, the Petzval sum of the entire system tilts largely in the negative direction, resulting in a field tilt in the direction opposite to the object side. Thus any departure from the range defined by condition (1) is not preferable.

Condition (2) is provided to reduce the overall length change of the lens system due to zooming while the zooming ratio is kept high. When the lower limit of −0.7 in condition (2) is not reached, the overall length change of the lens system becomes too large to make the zooming ratio high, so failing to achieve compactness. When the upper limit of −0.3 is exceeded, on the other hand, various aberrations, especially the spherical aberration at the telephoto end cannot be well corrected. According to the present invention, focusing to a nearby object point is achievable not only by the movement of the first lens unit alone but also by the independent movement of the respective lens units, the concurrent movement of the third and fourth lens unit, or the concurrent movement of the third, fourth and fifth lens units. Especially when focusing to a nearby object point is achieved by the concurrent movement of the first and second lens unit, the amount of focusing movement of the first and second lens units at the telephoto end becomes too large, unless the lower limit in condition (2) is reached. When the nearest distance is further reduced, the quantity of marginal rays becomes noticeably insufficient. When the upper limit is exceeded, on the contrary, the movement of the first and second lens units become too small, so imposing a certain limitation on movement accuracy and thereby incurring some considerable expense. Thus any deviation from the range defined by condition (2) is not preferable.

By satisfying the above-mentioned constructional requirement and conditions (1) and (2), it is possible to obtain a zooming lens system well corrected for various aberrations. Furthermore in the present invention, the following condition (3) is satisfied so that a zooming lens system of higher performance can be achieved.

$$-0.2 < f_2/f_T < -0.1 \qquad (3)$$

Condition (3) is here given to place the performance and overall length of the lens system with respect to the telephoto end in particular in a well-balanced state. When the lower limit of −0.2 in condition (3) is not reached, the composite focal length of the negative lens components located on the image side of the telephoto end—which forms the telephoto type—becomes too large, resulting in an increase in the overall length at the telephoto end. When the upper limit of −0.1 is exceeded, on the other hand, the refracting power of the second lens unit having negative refracting power becomes too large, and so the resultant positive spherical aberration becomes too pronounced to be overcorrected in view of the entire system. Thus any departure from the range defined by condition (3) is not desired.

Alternatively, a zooming lens system of higher performance can be obtained by conforming to the following condition (4) in addition to satisfying the above-mentioned constructional requirement and conditions (1) and (2).

$$0.25 < f_{W345}/f_T < 0.35 \qquad (4)$$

Here $f_{W345}$ is the composite focal length of the third, fourth and fifth lens units at the wide-angle end. Condition (4) is given to keep the overall length of the lens system in a compact, well-balanced state while various aberrations from the wide-angle end to the telephoto end, especially the spherical aberration are well corrected. When the lower limit of 0.25 is not reached, the spherical aberration of the entire system remains undercorrected, although the overall length of the lens system is kept short. When the upper limit of 0.35 is exceeded, on the contrary, not only are the aberrations of the entire system overcorrected, but the overall length of the lens system also becomes too large. Thus any deviation from the range defined by condition (4) is not desired.

Still alternatively, a zooming lens system of higher performance can be obtained by conforming to the following condition (5) in addition to satisfying the above-mentioned constructional requirement and conditions (1) and (2).

$$-1.2 < f_{W12}/f_W < -0.8 \qquad (5)$$

Here $f_{W12}$ is the composite focal length of the first and second lens unit at the wide-angle end. Condition (5) is given to obtain satisfactory near distance-performance when focusing is carried out by the concurrent movement of the first and second lens units. When the lower limit of −1.2 is not reached, not only is the amount of focusing movement of the first and second lens units increased, resulting in considerable aberration variations, but the quantity of marginal rays is also increased when the nearest distance is made short. When the upper limit of −0.8 is exceeded, on the contrary, the amount of focusing movement decreases with a decrease in aberration variations, but some severity is imposed on movement accuracy, ending up with cost increases. Thus any departure from the range defined by condition (5) is not preferable.

Of course, satisfactory performance is achievable by conforming to two or three of conditions (3), (4) and (5) at once in addition to satisfying the above-mentioned constructional requirement and conditions (1) and (2), and zooming is achievable by the concurrent movement of some lens units that are not adjacent to each other as well.

Especially when the third, fourth and fifth lens units are arranged in a positive refracting power profile as embodied in the present invention, the position of the exit pupil is located farther at the wide-angle end; that is, the effective diameters of the fourth and fifth lens units at the wide-angle end in particular must be increased so as to secure the quantity of marginal rays at the wide-angle end. Consequently, the pencil of off-axis rays from an intermediate focal length position to the telephoto end becomes too large. Especially in the case of a bright lens system, it is thus often required that the number of lenses be increased so as to make correction for aberrations introduced by the fourth and fifth lens units. In this case, it is therefore preferable that a flare stop of variable effective diameter is provided somewhere between the third lens unit and the image side, said stop being movable along the optical axis for zooming and designed to have a maximum effective diameter at the wide-angle end, because higher off-axis performance can be obtained all over the zooming space. It is here to be understood that the flare stop produces its own effect if it is located somewhere between the third lens unit and the image side. Especially if it is located between the third and fourth lens units or between the fourth and fifth lens units, its effect is more enhanced.

To reduce the aberration variations due to focusing from the wide-angle end to the telephoto end and make the nearest distance short, it is more effective to reduce conditions (2) or (5) to:

$$-0.6 < f_{T12}/f_T < -0.4 \quad (2')$$

$$-1.05 < f_{W12}/f_W < -0.85 \quad (5')$$

Any departure from the range defined by condition (2') or (5') is not preferable because it is then difficult to more satisfactorily reduce the aberration variations of the entire system due to focusing and make the nearest distance shorter.

To achieve a higher zooming ratio and reduce the overall length of the lens system from the wide-angle end to the telephoto end while the Petzval sum is kept to a good value, it is more preferable to reduce conditions (1) and (3) to:

$$-0.75 < f_2/f_W < -0.55 \quad (1')$$

$$-0.2 < f_2/f_T < -0.15 \quad (3')$$

Any departure from the ranges defined by conditions (1') and (3') is not preferable because the refracting power profile of the second lens unit is in an ill-balanced state, so making it impossible to achieve any higher zooming ratio and compactness simultaneously.

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

DESCRIPTION OF THE PREFERRED EMBODIMENTS

The present invention will now be explained in further detail with reference to Examples 1–4 of the present zooming lens system.

Numerical data about each example will be given later. Lens arrangements of Examples 1–4 at the wide-angle ends, intermediate focal length positions and telephoto ends, when they are focused on the object point at infinity, are shown in section in FIGS. 1–4, wherein letter S is a mark showing where a stop is located.

Each example is directed to a zooming lens system comprising, in order from the object side, a first lens unit I having positive refracting power, a second lens unit II having negative refracting power, a third lens unit III having positive refracting power, a fourth lens unit IV having positive refracting power and a fifth lens unit V having positive refracting power. For zooming, the first, third, fourth and fifth lens units I, III, IV and V are moved toward the object side, with the fourth lens unit IV being moved at a faster speed than the third or fifth lens unit III or V. For focusing, the first and second lens units I and II are moved concurrently. The nearest distance is set at positions −800 mm, −500 mm and −400 mm away from the surfaces proximate to the object side in Example 1, Examples 2 and 3, and Example 4, respectively.

Figure 1:
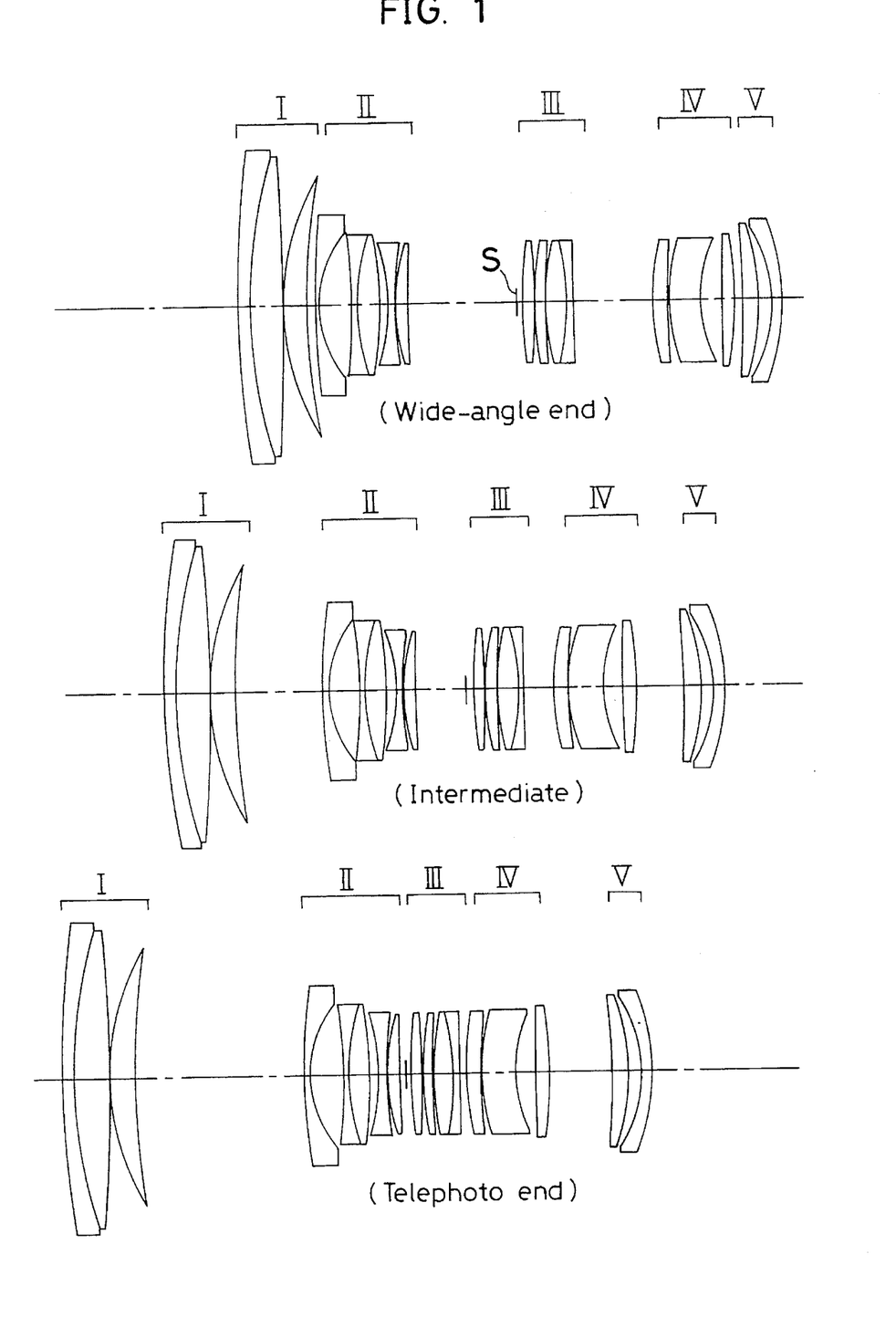
FIG. 1 illustrates sectional lens arrangements of Example 1 of the zooming lens system according to the present invention at the wide-angle end, at an intermediate focal length position and at the telephoto end, when the object point is at infinity.

In Example 1, the first lens unit I is made up of a cemented lens consisting of a negative meniscus lens convex on the object side and a double-convex lens and a positive meniscus lens convex on the object side; the second lens unit II is made up of a negative meniscus lens convex on the object side, a cemented lens consisting of double-concave and double-convex lenses, a double-concave lens and a positive meniscus lens convex on the object side; the third lens unit III is made up of a double-convex lens, a positive meniscus lens convex on the object side and a cemented lens consisting of double-convex and double-concave lenses, with a stop located on the object side as a one-piece; the fourth lens unit IV is made up of a positive meniscus lens convex on the object side, a negative meniscus lens convex on the object side and a double-convex lens; and the fifth lens unit V is made up of a negative meniscus lens convex on the image surface side and a negative meniscus lens convex on the image surface side. Various aberrations are well corrected by conforming to conditions (1) and (2). Furthermore in this example, conditions (3)–(5) are satisfied.

Figure 2:
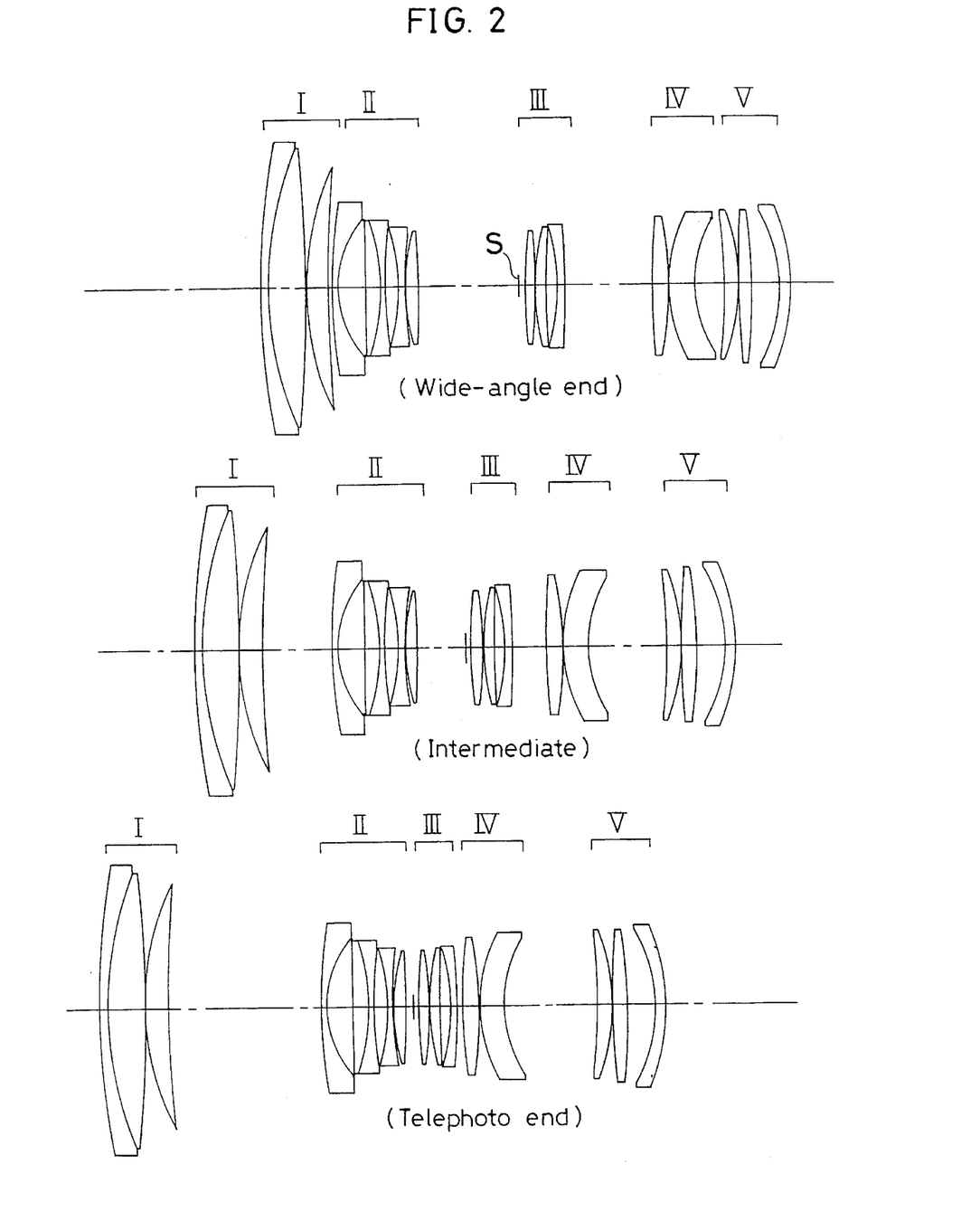
FIG. 2 illustrates sectional lens arrangements of Example 2 of the zooming lens system according to the present invention at the wide-angle end, at an intermediate focal length position and at the telephoto end, when the object point is at infinity.

In Example 2, the first lens unit I is made up of a cemented lens consisting of a negative meniscus lens convex on the object side and a double-convex lens and a positive meniscus lens convex on the object side; the second lens unit II is made up of a negative meniscus lens convex on the object side, a cemented lens consisting of double-convex and double-concave lenses, a double-concave lens and a double-convex lens; the third lens unit III is made up of a double-convex lens, a double-convex lens and a negative meniscus lens convex on the image surface side, with a stop located on the object side as a one-piece; the fourth lens unit IV is made up of a double-convex lens and a negative meniscus lens convex on the object side; and the fifth lens unit V is made up of a positive meniscus lens convex on the image surface side, a double-convex lens and a negative meniscus lens convex on the image surface side. Various aberrations are well corrected by conforming to conditions (1) and (2). Furthermore in this example, conditions (3)–(5) are satisfied.

Figure 3:
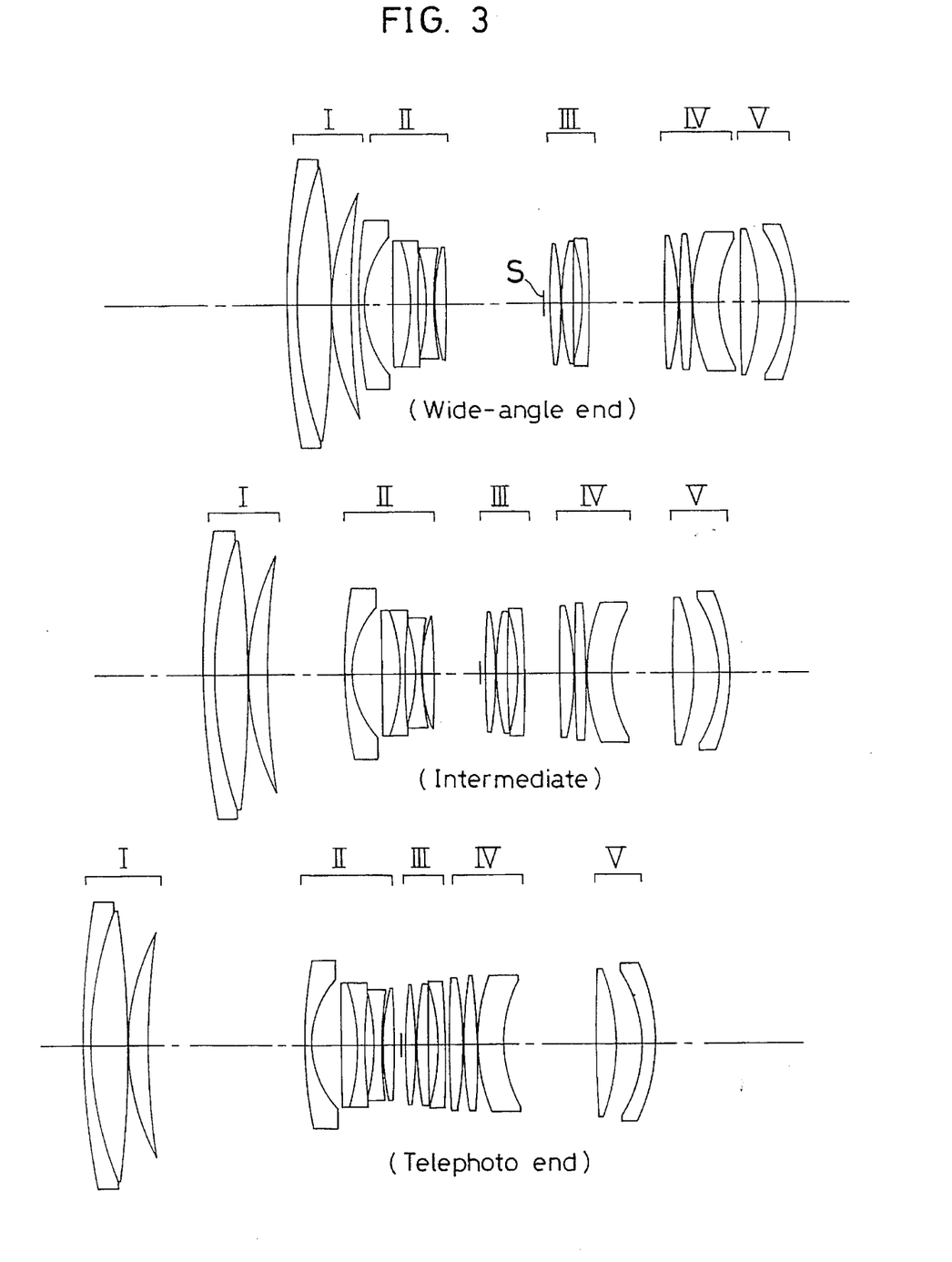
FIG. 3 illustrates sectional lens arrangements of Example 3 of the zooming lens system according to the present invention at the wide-angle end, at an intermediate focal length position and at the telephoto end, when the object point is at infinity.

In Example 3, the first lens unit I is made up of a cemented lens consisting of a negative meniscus lens convex on the object side and a double-convex lens and a positive meniscus lens convex on the object side; the second lens unit II is made up of a negative meniscus lens convex on the object side, a cemented lens consisting of double-convex and double-concave lenses, a double-concave lens and a double-convex lens; the third lens unit III is made up of a double-convex lens, a positive meniscus lens convex on the object side and a negative meniscus lens convex on the image surface side, with a stop located on the object side as a one-piece; the fourth lens unit IV is made up of a double-convex lens, a double-convex lens and a negative meniscus lens convex on the object side; and the fifth lens unit V is made up of a double-convex lens and a negative meniscus lens convex on the image surface side. Various aberrations are well corrected by conforming to conditions (1) and (2). Furthermore in this example, conditions (3)–(5) are satisfied.

Figure 4:
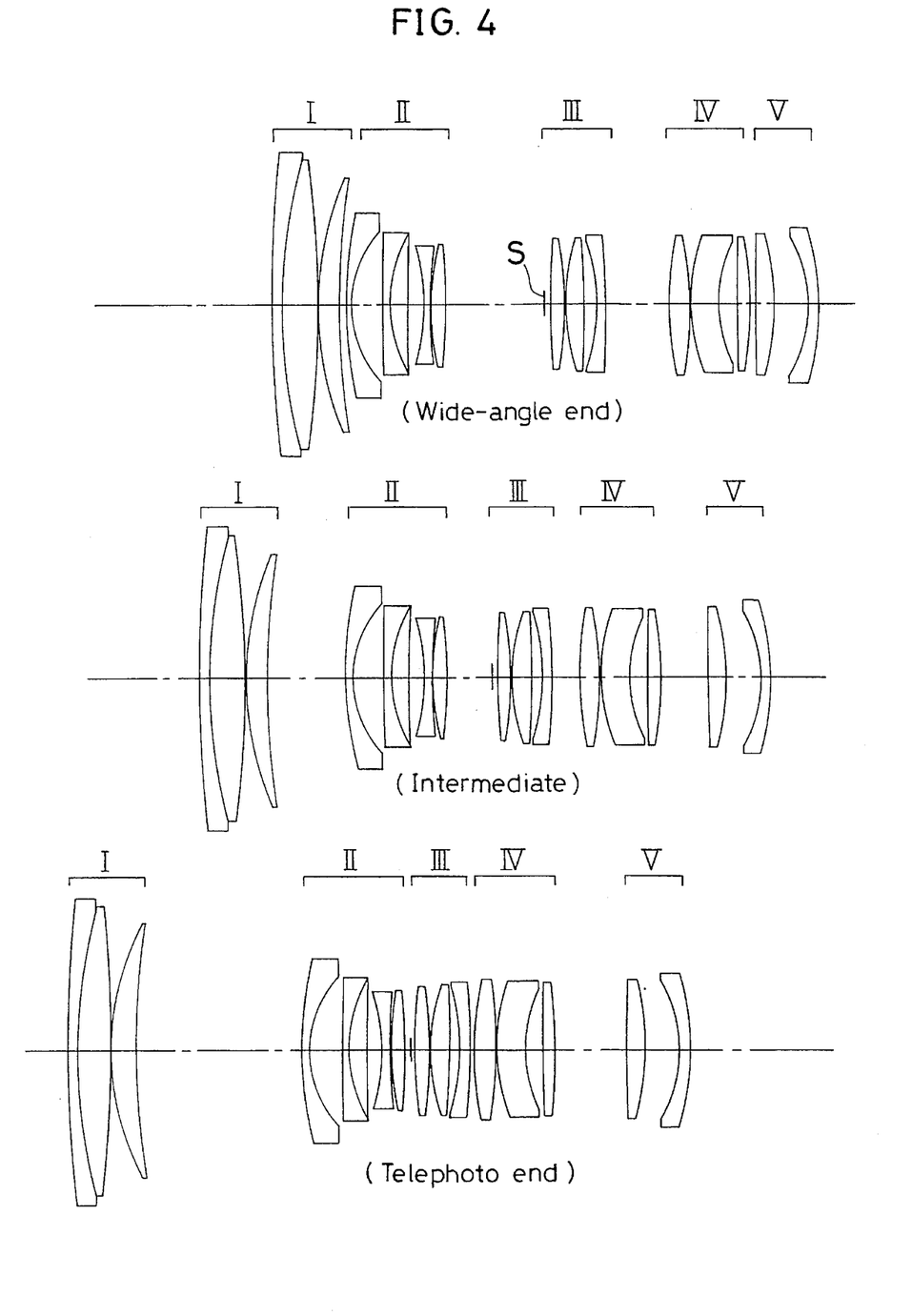
FIG. 4 illustrates sectional lens arrangements of Example 4 of the zooming lens system according to the present invention at the wide-angle end, at an intermediate focal length position and at the telephoto end, when the object point is at infinity.

In Example 4, the first lens unit I is made up of a cemented lens consisting of a negative meniscus lens convex on the object side and a double-convex lens and a positive meniscus lens convex on the object side; the second lens unit II is made up of a negative meniscus lens convex on the object side, a cemented lens consisting of a negative meniscus lens convex on the object side and a positive meniscus lens convex on the object side, a double-concave lens and a double-convex lens; the third lens unit III is made up of a double-convex lens, a double-convex lens and a negative meniscus lens convex on the image surface side; the fourth lens unit IV is made up of a double-convex lens, a negative meniscus lens convex on the object side and a double-convex lens; and the fifth lens unit V is made up of a positive meniscus lens convex on the image surface side and a negative meniscus lens convex on the image surface side. Various aberrations are well corrected by conforming to conditions (1) and (2). Furthermore in this example, conditions (3)–(5) are satisfied.

Numerical data about each example will be enumerated below. The symbols used hereinafter but not hereinbefore have the following meanings:

$f$ is the focal length of the entire system, $F_{NO}$ is the F-number, $2\omega$ is the field angle, $f_B$ is the back focus, $r_1$, $r_2$, ... are the radii of curvature of the respective lens surfaces, $d_1$, $d_2$, ... are the separations between the respective lens surfaces, $n_{d1}$, $n_{d2}$, ... are the d-line refractive indices of the respective lenses, and $\nu_{d1}$, $\nu_{d2}$, ... are the Abbe number of the respective lenses.

EXAMPLE 1

$f = 29.338\sim54.256\sim103.831$
$F_{NO} = 3.55\sim4.05\sim4.55$
$2\omega = 75.96\sim42.56\sim22.84°$
$f_B = 36.003\sim46.168\sim58.835$

| | | | |
|---|---|---|---|
| $r_1 = 173.3134$ | $d_1 = 1.6000$ | $n_{d1} = 1.84666$ | $\nu_{d1} = 23.78$ |
| $r_2 = 76.0930$ | $d_2 = 5.3653$ | $n_{d2} = 1.65160$ | $\nu_{d2} = 58.52$ |
| $r_3 = -306.4700$ | $d_3 = 0.1500$ | | |
| $r_4 = 40.3065$ | $d_4 = 3.8694$ | $n_{d3} = 1.48749$ | $\nu_{d3} = 70.20$ |
| $r_5 = 110.5404$ | $d_5 = $ (Variable) | | |
| $r_6 = 114.8394$ | $d_6 = 1.2000$ | $n_{d4} = 1.77250$ | $\nu_{d4} = 49.66$ |
| $r_7 = 17.2546$ | $d_7 = 4.7241$ | | |
| $r_8 = -127.0125$ | $d_8 = 1.2000$ | $n_{d5} = 1.83481$ | $\nu_{d5} = 42.72$ |
| $r_9 = 35.4075$ | $d_9 = 3.2305$ | $n_{d6} = 1.75520$ | $\nu_{d6} = 27.51$ |
| $r_{10} = -63.7779$ | $d_{10} = 1.4523$ | | |
| $r_{11} = -29.6480$ | $d_{11} = 1.2000$ | $n_{d7} = 1.69680$ | $\nu_{d7} = 55.52$ |
| $r_{12} = 67.2560$ | $d_{12} = 0.1500$ | | |
| $r_{13} = 38.8302$ | $d_{13} = 1.6924$ | $n_{d8} = 1.84666$ | $\nu_{d8} = 23.78$ |
| $r_{14} = 140.6603$ | $d_{14} = $ (Variable) | | |
| $r_{15} = $ (Stop) | $d_{15} = 0.8000$ | | |
| $r_{16} = 72.9856$ | $d_{16} = 1.7396$ | $n_{d9} = 1.80400$ | $\nu_{d9} = 46.57$ |
| $r_{17} = -202.8951$ | $d_{17} = 0.1500$ | | |
| $r_{18} = 53.0123$ | $d_{18} = 1.5840$ | $n_{d10} = 1.77250$ | $\nu_{d10} = 49.66$ |
| $r_{19} = 100.5729$ | $d_{19} = 0.1500$ | | |
| $r_{20} = 41.9891$ | $d_{20} = 3.4021$ | $n_{d11} = 1.48749$ | $\nu_{d11} = 70.20$ |
| $r_{21} = -39.4591$ | $d_{21} = 0.9567$ | $n_{d12} = 1.84666$ | $\nu_{d12} = 23.78$ |
| $r_{22} = 21091.0872$ | $d_{22} = $ (Variable) | | |
| $r_{23} = 41.6767$ | $d_{23} = 2.2847$ | $n_{d13} = 1.77250$ | $\nu_{d13} = 49.66$ |
| $r_{24} = 77.8028$ | $d_{24} = 0.1500$ | | |
| $r_{25} = 28.5724$ | $d_{25} = 5.3303$ | $n_{d14} = 1.80518$ | $\nu_{d14} = 25.43$ |
| $r_{26} = 20.4090$ | $d_{26} = 3.1344$ | | |
| $r_{27} = 203.5345$ | $d_{27} = 2.2414$ | $n_{d15} = 1.51633$ | $\nu_{d15} = 64.15$ |
| $r_{28} = -72.6527$ | $d_{28} = $ (Variable) | | |
| $r_{29} = -333.3290$ | $d_{29} = 2.7755$ | $n_{d16} = 1.77250$ | $\nu_{d16} = 49.66$ |
| $r_{30} = -35.8091$ | $d_{30} = 2.3014$ | | |
| $r_{31} = -20.7926$ | $d_{31} = 1.5000$ | $n_{d17} = 1.83400$ | $\nu_{d17} = 37.16$ |
| $r_{32} = -33.6046$ | | | |

Zooming Spaces

| f | 29.338 | 54.256 | 103.831 |
|---|---|---|---|
| $d_5$ | 1.000 | 14.091 | 27.587 |
| $d_{14}$ | 17.492 | 8.415 | 1.164 |
| $d_{22}$ | 12.469 | 4.576 | 0.711 |
| $d_{28}$ | 1.000 | 7.359 | 9.602 |

$f_2/f_W = -0.598$
$f_{T12}/f_T = -0.468$
$f_2/f_T = -0.169$
$f_{w345}/f_T = 0.290$
$f_{w12}/f_w = -0.872$

EXAMPLE 2

$f = 29.484\sim54.209\sim103.726$
$F_{NO} = 3.55\sim4.05\sim4.55$
$2\omega = 75.56\sim42.76\sim22.90°$
$f_B = 37.035\sim47.230\sim59.559$

| | | | |
|---|---|---|---|
| $r_1 = 126.7596$ | $d_1 = 1.6000$ | $n_{d1} = 1.84666$ | $\nu_{d1} = 23.78$ |
| $r_2 = 59.9852$ | $d_2 = 5.8000$ | $n_{d2} = 1.60311$ | $\nu_{d2} = 60.70$ |
| $r_3 = -347.2283$ | $d_3 = 0.1500$ | | |
| $r_4 = 45.2740$ | $d_4 = 3.9000$ | $n_{d3} = 1.48749$ | $\nu_{d3} = 70.20$ |
| $r_5 = 156.9010$ | $d_5 = $ (Variable) | | |
| $r_6 = 120.9200$ | $d_6 = 1.4000$ | $n_{d4} = 1.77250$ | $\nu_{d4} = 49.66$ |
| $r_7 = 18.7210$ | $d_7 = 4.0242$ | | |
| $r_8 = 3047.8572$ | $d_8 = 2.6461$ | $n_{d5} = 1.80518$ | $\nu_{d5} = $ |

-continued

| | | | |
|---|---|---|---|
| $r_9 = -37.0378$ | $d_9 = 1.3000$ | $n_{d6} = 1.80400$ | $v_{d6} = 25.43$ |
| | | | $46.57$ |
| $r_{10} = 228.3308$ | $d_{10} = 1.9500$ | | |
| $r_{11} = -33.7906$ | $d_{11} = 1.2000$ | $n_{d7} = 1.69680$ | $v_{d7} = 55.52$ |
| $r_{12} = 65.9533$ | $d_{12} = 0.1500$ | | |
| $r_{13} = 43.6355$ | $d_{13} = 1.8000$ | $n_{d8} = 1.80518$ | $v_{d8} = 25.43$ |
| $r_{14} = -501.3406$ | $d_{14} = $ (Variable) | | |
| $r_{15} = $ (Stop) | $d_{15} = 0.8000$ | | |
| $r_{16} = 90.9139$ | $d_{16} = 1.7377$ | $n_{d9} = 1.77250$ | $v_{d9} = 49.66$ |
| $r_{17} = -85.1481$ | $d_{17} = 0.1500$ | | |
| $r_{18} = 41.4589$ | $d_{18} = 2.0872$ | $n_{d10} = 1.60311$ | $v_{d10} = 60.70$ |
| $r_{19} = -4112.6141$ | $d_{19} = 1.6096$ | | |
| $r_{20} = -35.8521$ | $d_{20} = 1.2000$ | $n_{d11} = 1.84666$ | $v_{d11} = 23.78$ |
| $r_{21} = -150.4069$ | $d_{21} = $ (Variable) | | |
| $r_{22} = 105.1716$ | $d_{22} = 2.9330$ | $n_{d12} = 1.65160$ | $v_{d12} = 58.52$ |
| $r_{23} = -58.0262$ | $d_{23} = 0.1500$ | | |
| $r_{24} = 26.8682$ | $d_{24} = 4.1072$ | $n_{d13} = 1.84666$ | $v_{d13} = 23.88$ |
| $r_{25} = 22.0074$ | $d_{25} = $ (Variable) | | |
| $r_{26} = -210.2986$ | $d_{26} = 2.6654$ | $n_{d14} = 1.48749$ | $v_{d14} = 70.20$ |
| $r_{27} = -38.0554$ | $d_{27} = 0.1500$ | | |
| $r_{28} = 254.1690$ | $d_{28} = 2.3166$ | $n_{d15} = 1.60311$ | $v_{d15} = 60.70$ |
| $r_{29} = -104.0530$ | $d_{29} = 5.1336$ | | |
| $r_{30} = -23.3250$ | $d_{30} = 1.5000$ | $n_{d16} = 1.84666$ | $v_{d16} = 23.78$ |
| $r_{31} = -33.9547$ | | | |

Zooming Spaces

| f | 29.484 | 54.209 | 103.726 |
|---|---|---|---|
| $d_5$ | 1.000 | 12.076 | 25.957 |
| $d_{14}$ | 17.853 | 8.824 | 1.500 |
| $d_{21}$ | 14.724 | 6.053 | 1.000 |
| $d_{25}$ | 4.692 | 12.897 | 15.746 |

$f_2/f_W = -0.651$
$f_{T12}/f_T = -0.501$
$f_2/f_T = -0.185$
$f_{w345}/f_T = 0.316$
$f_{w12}/f_w = -0.973$

EXAMPLE 3

$f = 28.942 \sim 54.201 \sim 103.891$
$F_{NO} = 3.55 \sim 4.05 \sim 4.55$
$2\omega = 76.22 \sim 42.78 \sim 22.88°$
$f_B = 37.369 \sim 48.636 \sim 61.720$

| | | | |
|---|---|---|---|
| $r_1 = 137.4925$ | $d_1 = 1.6000$ | $n_{d1} = 1.84666$ | $v_{d1} = 23.78$ |
| $r_2 = 64.7318$ | $d_2 = 5.4542$ | $n_{d2} = 1.48749$ | $v_{d2} = 70.20$ |
| $r_3 = -197.1783$ | $d_3 = 0.1500$ | | |
| $r_4 = 39.2445$ | $d_4 = 3.4280$ | $n_{d3} = 1.51633$ | $v_{d3} = 64.15$ |
| $r_5 = 124.4768$ | $d_5 = $ (Variable) | | |
| $r_6 = 69.5475$ | $d_6 = 1.4000$ | $n_{d4} = 1.77250$ | $v_{d4} = 49.66$ |
| $r_7 = 16.6047$ | $d_7 = 4.6786$ | | |
| $r_8 = 406.9742$ | $d_8 = 2.8752$ | $n_{d5} = 1.80518$ | $v_{d5} = 25.43$ |
| $r_9 = -34.5144$ | $d_9 = 1.3000$ | $n_{d6} = 1.80400$ | $v_{d6} = 46.57$ |
| $r_{10} = 248.0973$ | $d_{10} = 1.5281$ | | |
| $r_{11} = -28.1648$ | $d_{11} = 1.2000$ | $n_{d7} = 1.69680$ | $v_{d7} = 55.52$ |
| $r_{12} = 65.7744$ | $d_{12} = 0.1500$ | | |

-continued

| | | | |
|---|---|---|---|
| $r_{13} = 41.7365$ | $d_{13} = 1.5147$ | $n_{d8} = 1.80518$ | $v_{d8} = 25.43$ |
| $r_{14} = -960.9249$ | $d_{14} = $ (Variable) | | |
| $r_{15} = $ (Stop) | $d_{15} = 0.6000$ | | |
| $r_{16} = 97.6263$ | $d_{16} = 1.6800$ | $n_{d9} = 1.77250$ | $v_{d9} = 49.66$ |
| $r_{17} = -73.3863$ | $d_{17} = 0.1500$ | | |
| $r_{18} = 38.6793$ | $d_{18} = 1.9948$ | $n_{d10} = 1.69680$ | $v_{d10} = 55.52$ |
| $r_{19} = 513.5959$ | $d_{19} = 1.5966$ | | |
| $r_{20} = -36.9343$ | $d_{20} = 1.2000$ | $n_{d11} = 1.84666$ | $v_{d11} = 23.78$ |
| $r_{21} = -215.5542$ | $d_{21} = $ (Variable) | | |
| $r_{22} = 344.5120$ | $d_{22} = 2.1699$ | $n_{d12} = 1.48749$ | $v_{d12} = 70.20$ |
| $r_{23} = -49.4238$ | $d_{23} = 0.1500$ | | |
| $r_{24} = 144.5597$ | $d_{24} = 1.8971$ | $n_{d13} = 1.69680$ | $v_{d13} = 55.52$ |
| $r_{25} = -170.9810$ | $d_{25} = 0.1500$ | | |
| $r_{26} = 29.7954$ | $d_{26} = 4.3356$ | $n_{d14} = 1.80518$ | $v_{d14} = 25.43$ |
| $r_{27} = 22.4853$ | $d_{27} = $ (Variable) | | |
| $r_{28} = 574.0489$ | $d_{28} = 3.0684$ | $n_{d15} = 1.60311$ | $v_{d15} = 60.70$ |
| $r_{29} = -33.7122$ | $d_{29} = 4.5291$ | | |
| $r_{30} = -20.8075$ | $d_{30} = 1.7000$ | $n_{d16} = 1.80518$ | $v_{d16} = 25.43$ |
| $r_{31} = -30.4814$ | | | |

Zooming Spaces

| f | 28.942 | 54.201 | 103.891 |
|---|---|---|---|
| $d_5$ | 1.000 | 12.749 | 25.615 |
| $d_{14}$ | 16.633 | 7.945 | 1.500 |
| $d_{21}$ | 12.245 | 5.788 | 1.000 |
| $d_{27}$ | 3.667 | 10.018 | 15.565 |

$f_2/f_W = -0.623$
$f_{T12}/f_T = -0.452$
$f_2/f_T = -0.173$
$f_{w345}/f_T = 0.293$
$f_{w12}/f_w = -0.911$

EXAMPLE 4

$f = 29.210 \sim 54.222 \sim 103.871$
$F_{NO} = 3.55 \sim 4.05 \sim 4.55$
$2\omega = 76.16 \sim 42.64 \sim 22.82°$
$f_B = 36.561 \sim 46.976 \sim 60.574$

| | | | |
|---|---|---|---|
| $r_1 = 239.8579$ | $d_1 = 1.6000$ | $n_{d1} = 1.84666$ | $v_{d1} = 23.78$ |
| $r_2 = 84.9667$ | $d_2 = 5.7238$ | $n_{d2} = 1.48749$ | $v_{d2} = 70.20$ |
| $r_3 = -178.5627$ | $d_3 = 0.1500$ | | |
| $r_4 = 49.0432$ | $d_4 = 3.5615$ | $n_{d3} = 1.69680$ | $v_{d3} = 55.52$ |
| $r_5 = 136.5761$ | $d_5 = $ (Variable) | | |
| $r_6 = 66.7945$ | $d_6 = 1.2000$ | $n_{d4} = 1.77250$ | $v_{d4} = 49.66$ |
| $r_7 = 17.9224$ | $d_7 = 4.8367$ | | |
| $r_8 = 271.0697$ | $d_8 = 1.2000$ | $n_{d5} = 1.80400$ | $v_{d5} = 46.57$ |
| $r_9 = 23.0817$ | $d_9 = 3.0464$ | $n_{d6} = 1.80518$ | $v_{d6} = 25.43$ |
| $r_{10} = 121.7144$ | $d_{10} = 2.8045$ | | |
| $r_{11} = -27.2160$ | $d_{11} = 1.2000$ | $n_{d7} = 1.77250$ | $v_{d7} = 49.66$ |
| $r_{12} = 91.5955$ | $d_{12} = 0.1500$ | | |
| $r_{13} = 56.3743$ | $d_{13} = 2.0791$ | $n_{d8} = 1.80518$ | $v_{d8} = 25.43$ |
| $r_{14} = -106.5854$ | $d_{14} = $ (Variable) | | |
| $r_{15} = $ (Stop) | $d_{15} = 0.8000$ | | |
| $r_{16} = 129.8285$ | $d_{16} = 2.2554$ | $n_{d9} = 1.69680$ | $v_{d9} = 55.52$ |
| $r_{17} = -55.9718$ | $d_{17} = 0.1500$ | | |
| $r_{18} = 33.0270$ | $d_{18} = 2.9989$ | $n_{d10} = 1.48749$ | $v_{d10} = $ |

-continued

| | | | 70.20 |
|---|---|---|---|
| $r_{19} = -298.9479$ | $d_{19} = 2.0526$ | | |
| $r_{20} = -32.5119$ | $d_{20} = 1.4000$ | $n_{d11} = 1.80518$ | $v_{d11} = 25.43$ |
| $r_{21} = -151.5213$ | $d_{21} = $ (Variable) | | |
| $r_{22} = 50.7501$ | $d_{22} = 3.5766$ | $n_{d12} = 1.48749$ | $v_{d12} = 70.20$ |
| $r_{23} = -56.4758$ | $d_{23} = 0.1500$ | | |
| $r_{24} = 33.9266$ | $d_{24} = 4.6296$ | $n_{d13} = 1.84666$ | $v_{d13} = 23.78$ |
| $r_{25} = 23.5610$ | $d_{25} = 2.8464$ | | |
| $r_{26} = 524.6992$ | $d_{26} = 2.1416$ | $n_{d14} = 1.61800$ | $v_{d14} = 63.38$ |
| $r_{27} = -87.9086$ | $d_{27} = $ (Variable) | | |
| $r_{28} = -525.8731$ | $d_{28} = 2.9925$ | $n_{d15} = 1.77250$ | $v_{d15} = 49.66$ |
| $r_{29} = -40.4291$ | $d_{29} = 5.6345$ | | |
| $r_{30} = -22.3283$ | $d_{30} = 1.5000$ | $n_{d16} = 1.78590$ | $v_{d16} = 44.18$ |
| $r_{31} = -39.8536$ | | | |

Zooming Spaces

| f | 29.210 | 54.222 | 103.871 |
|---|---|---|---|
| $d_5$ | 1.000 | 13.184 | 27.587 |
| $d_{14}$ | 16.607 | 7.757 | 1.200 |
| $d_{21}$ | 10.264 | 4.346 | 0.800 |
| $d_{27}$ | 1.100 | 8.013 | 11.796 |

$f_2/f_W = -0.636$
$f_{T12}/f_T = -0.447$
$f_2/f_T = -0.179$
$f_{W345}/f_T = 0.296$
$f_{W12}/f_W = -0.907$

As set forth above and as can be appreciated from the respective examples, it is possible according to the present invention to obtain a zooming lens system which covers a wide-angle zone, has a zooming ratio of approximately 3 or higher, and is well corrected for various aberrations.

What we claim is:

1. A zooming lens system which comprises, in order from the object side, a first lens unit having positive refracting power, a second lens unit having negative refracting power, a third lens unit having positive refracting power, a fourth lens unit having positive refracting power and a fifth lens unit having positive refracting power, with at least said first, third, fourth and fifth lens units being moved toward the object side for zooming from the wide-angle end to the telephoto end, and which conforms to the following conditions:

$$-0.8 < f_2/f_W < -0.5 \quad (1)$$

$$-0.7 < f_{T12}/f_T < -0.3 \quad (2)$$

where $f_2$ is the focal length of the second lens unit, $f_W$ is the focal length of the entire system at the wide-angle end, $f_{T12}$ is the composite focal length of the first and second lens units at the telephoto end, and $f_T$ is the focal length of the entire system at the telephoto end.

2. The zooming lens system according to claim 1, characterized in that focusing is carried out by the concurrent movement of said first and second lens units.

3. The zooming lens system according to claim 1, characterized in that at least one of the following conditions is satisfied:

$$-0.2 < f_2/f_T < -0.1 \quad (3)$$

$$0.25 < f_{W345}/f_T < 0.35 \quad (4)$$

$$-1.2 < f_{W12}/f_W < -0.8 \quad (5)$$

where $f_{W345}$ is the composite focal length of the third, fourth and fifth lens units at the wide-angle end, and $f_{W12}$ is the composite focal length of the first and second lens units at the wide-angle end.

4. The zooming lens system according to claim 1, characterized in that an axially movable flare stop is located on the image side of said third lens unit.

5. The zooming lens system according to claim 3, characterized in that the following conditions are further satisfied:

$$-0.6 < f_{T12}/f_T < -0.4 \quad (2')$$

$$-1.05 < f_{W12}/f_W < -0.85 \quad (5').$$

6. The zooming lens system according to claim 3, characterized in that the following conditions are further satisfied:

$$-0.75 < f_2/f_W < -0.55 \quad (1')$$

$$-0.2 < f_2/f_T < -0.15 \quad (3').$$

7. The zooming lens system according to claim 1, characterized in that while said second lens unit remains fixed during zooming, said fourth lens unit is moved toward the object side at a faster speed than said third and fifth lens units.

8. The zooming lens system according to claim 4, characterized in that said flare stop has a variable aperture, the size of which becomes maximum at the wide-angle end.

9. A zoom lens system according to claim 1, wherein said fifth lens unit comprises a positive lens and a negative lens.

* * * * *